[11] 3,602,786

[72] Inventors Georgy Ignatievich Izhelya
ulitsa Malo-Podvalnaya, 14 Kv. 13;
Konstantin Alexeevich Bykov, ulitsa
Streletskaya, 14, Kv. 12; Alexandr
Ivanovich Vishnikin, ulitsa Dovnar-
Zapalskogo, 4, Kv. 39; Vladimir
Andreevich Mishakin, ulitsa
Selskokhozyais-trvennaya, 7/9/Kv. 19;
Sergei Alexeevich Rebrov, ulitsa Nikolsko-
Botanicheskaya, 14 Kv. 20; Itskhok
Avrumovich Spektor, ulitsa Muromskaya
3, Kv. 15; Alexandr Grigorievich
Shapovalenko, ulitsa Zatonskogo, 15/41,
Kv. 25, all of Kiev, U.S.S.R.
[21] Appl. No. 48,105
[22] Filed June 22, 1970
[45] Patented Aug. 31, 1971

[54] INDUCTION LINEAR ELECTRIC MOTOR
3 Claims, 2 Drawing Figs.
[52] U.S. Cl. ................................................ 318/135,
318/243, 310/13
[51] Int. Cl. ...................................................... H02k 41/02
[50] Field of Search ........................................ 310/12–14,
190, 191, 209; 318/121, 135, 243, 360; 104/148,
148 LM; 49/360

[56] References Cited
UNITED STATES PATENTS
| | | | |
|---|---|---|---|
| 1,855,617 | 4/1932 | Stewart .......................... | 318/243 X |
| 2,856,573 | 10/1958 | Williams et al. .............. | 318/243 |
| 3,265,949 | 8/1966 | Rouverol ....................... | 318/243 |
| 2,412,514 | 12/1946 | Jones ............................. | 318/135 |

Primary Examiner—D. F. Duggan
Attorney—Waters, Roditi, Schwartz & Nissen

ABSTRACT: An induction linear electric motor comprising a pair of linear stators with their respective windings, movably mounted at the opposite sides of a stationary rotor member. Control of the travelling speed of the linear stators relative to the rotor in the direction of the motion of the traveling magnetic field, produced by the stators and their windings, is effected by displacing the stators and their windings relative to the rotor in a direction perpendicular to the direction of the motion of the magnetic field. When the travelling speed is controlled in the above-described member, with the stators displaced relative to the rotor, a portion of the magnetic flux produced by the stators is taken up by an auxiliary magnetic core of the disclosed; linear electric motor, this auxiliary magnetic core being disposed intermediate of the linear stators.

INDUCTION LINEAR ELECTRIC MOTOR

The present invention relates to electrical machines, and, more particularly, it relates to induction linear electric motors, and it can be incorporated in traction means for an electrically propelled monorail vehicles, as well as in the driving means of the carriages of knitting machines, of gantry cranes, of the work tables of surface grinding machines, and in many other vehicles and work performing machines.

Incorporation of induction linear electric motors in the traction means of monorail vehicles is known, where an induction electric motor propels a monorail vehicle and comprises a pair of linear stators with their respective multiphase wound windings and a traction rotor-rail. The traction rail includes a massive bar of a ferromagnetic material, e.g. a rolled steel shape without any additional machining. The traction rail is rigidly secured to a beam support of the monorail way.

The windings of the linear stators are connected to a source of multiphase electric current and create a travelling or "running" magnetic field, which moves longitudinally of the traction rail (which in this known linear electric motor acts similarly to the rotor of a commonly known induction electric motor, where the rotor is mounted for rotary motion). The interaction of the "running" magnetic field with eddy currents induced thereby in the massive traction rail creates a force driving the stators for a linear motion longitudinally of the rail. When the stators are connected to a bogie of a monorail vehicle, this force is utilized for propelling this monorail vehicle.

The connection of the linear stators with the monorail vehicle should include elastic means, for the oscillations of the moving vehicle not to be transmitted to the linear stators of the propelling electric motor.

A desired value of the air gaps between the traction rail and the adjacent surfaces of the magnetic cores of the linear stators is maintained by means of a system of thrust and support rollers, arranged to serve the purpose.

With the ferromagnetic rotor-rail being positioned intermediate of the magnetic cores of the linear stators, there appears therebetween a force of magnetic attraction. In order to compensate for this force of magnetic attraction, the linear stators are mounted by means of spring-incorporating compensation devices.

However, the known apparatus of the above-described kind are not free from the following disadvantages: their travelling speed is controlled either by switching over the poles or the windings, or by varying the frequency of the power supply of the stator windings.

When the travelling speed is controlled by switching over the poles of the windings of the linear stators, it is virtual impossible to effect infinite, stepless speed control; moreover, in this case the structure of the windings becomes complicated and the operation of the motor becomes more vulnerable. On the other hand, if the travelling speed is controlled by varying the frequency of the power supply, this involves the use of costly transducing means.

The present invention has for its aim the creation of an induction linear electric motor, which should feature infinite speed control within a wide range of speed values.

These and other objects are attained in an induction linear electric motor comprising a pair of linear stator structures with their respective windings, the stator structures being supported by a common housing and being disposed, respectively, at the opposite sides of a rotor member, in which linear electric motor the travelling speed of the relative motion of said stator structures and said rotor member in the direction of the motion of the running magnetic field created by the stator structures is controlled by relative displacement between the stator structures and the rotor member in a direction perpendicular to the direction of the motion of the running magnetic field created by the stator structures is controlled by relative displacement between the stator structures and the rotor member in a direction perpendicular to the direction of the motion of the running magnetic field; this induction electric linear motor, in accordance with the present invention, further comprising an auxiliary magnetic core positioned above said rotor member, intermediate of said pair of linear stator structures, said auxiliary magnetic core being adapted to take up a portion of the magnetic flux produced by said stator structures, as said stator structures and said rotor member are displaced relative to each other in said direction perpendicular to said direction of said motion of said running magnetic field, for the purpose of speed control.

According to a preferred embodiment of the present invention, it is advisable for the auxiliary magnetic core to have a multileaf structure and for its length to be at least equal to the length of each one of the two linear stator structures.

The present invention will be better understood from the following detailed description of a preferred embodiment thereof, with due reference being had to the accompanying drawings wherein.

Figure 1:
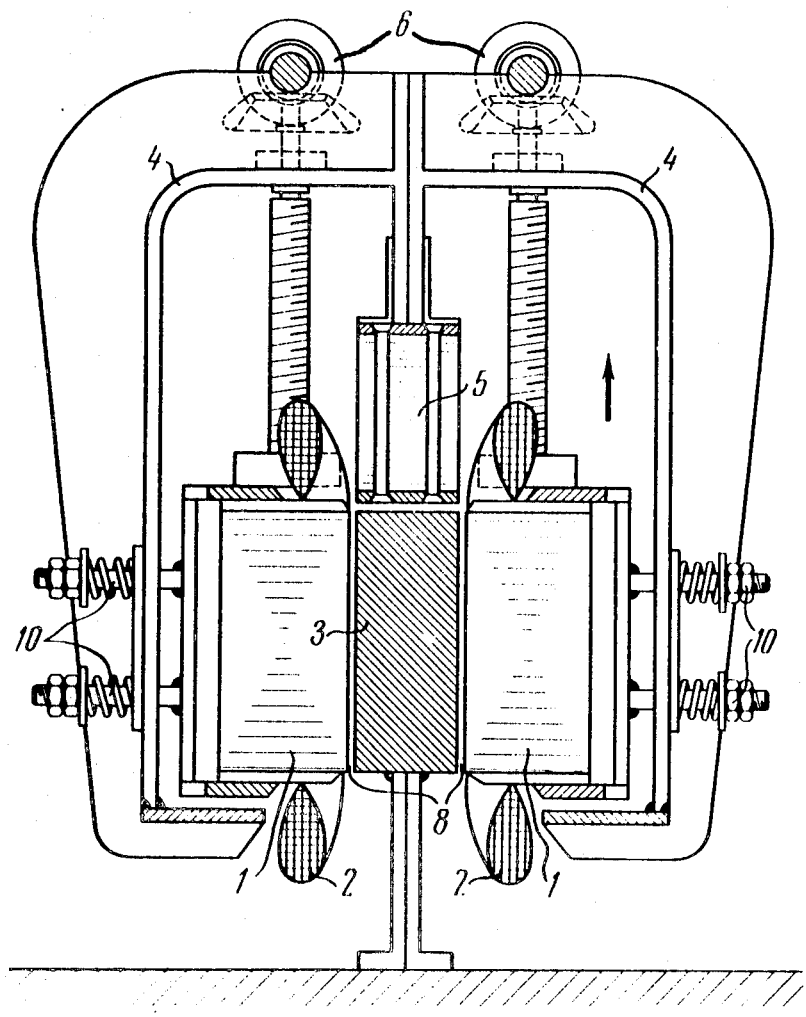
FIG. 1 shows schematically an induction linear electric motor, embodying the present invention, constructed for an application, as propelling means for a monorail vehicle (cross-sectional view)
Figure 2:
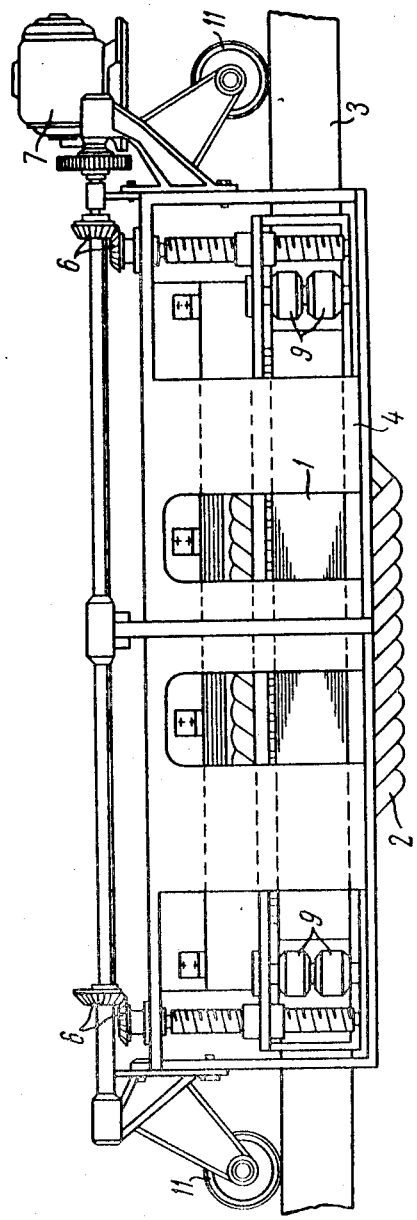
FIG. 2 shows the same, as FIG. 1, side view.

Referring now in particular to the appended drawings, the induction linear electric motor comprises two linear stators 1 (FIG. 1) with their respective windings 2. The two stators 1 are disposed at the opposite sides of a rotor 3, i.e. a structure of which the function is similar to that of a rotor in a commonly known rotary electric motor. It should be understood that in the herein disclosed embodiment of a linear electric motor the "rotor" 3 is intended by no means for rotation relative to the "stators" 1, or vice versa. So, here the terms "stator" and "rotor" are used for convenience only, without any further implications, as to their actual mode of motion. In the herein disclosed exemplary embodiment of the present invention, the linear electric motor is intended for use as propelling means, e.g. for a monorail vehicle, and the rotor 3 is a traction rail made of a ferromagnetic material in the form of a massive steel bar which is rigidly secured to a supporting surface or structure. The two stators 1 with their respective windings 2 are carried by their common housing structure 4. Mounted internally of the housing structure 4 and rigidly secured thereto vertically above the rotor-rail 3 is an auxiliary magnetic core made in the form of a multileaf package, wherein each leaf is made of electrical engineering steel, with the leaves in the package being electrically insulated from each other by any convenient known means. The two linear stators 1 are carried by the housing structure 4 with provisions for their lateral and vertical adjustment relative to the rotor-rail 3. Vertical adjustment of the stators 1 in relation to the rotor-rail 3 is effected by means of a lifting mechanism 6 which is either electrically or mechanically actuated (FIG. 2). The values of the two air gaps 8 between the opposite sides of the rotor-rail 3 (FIG. 1) and the respective ones of the two stators 1 are adjusted with the help of laterally adjustable thrust rollers 9 (FIG. 2). In order to reduce and balance the forces created by magnetic attraction between the linear stators 1 and the rotor-rail 3, acting upon the rollers 9, the linear stators 1 are connected to the housing structure 4 through a respective pair of compensating spring devices 10 (FIG. 1). The entire housing structure 4 with the stators 1 is supported on the rotor-rail 3 by means of at least a pair of support rollers 11 (FIG. 2).

The herein disclosed induction electric motor operates, as follows.

When the windings 2 (FIG. 1) of the linear stators 1 are connected to a multiphase alternating-current power supply mains, the currents flowing through the windings 2 create a "running" magnetic field which moves at a constant speed in a direction perpendicular to the plane of the drawing (FIG. 1), i.e. longitudinally of the rotor-rail 3. The speed of this motion is defined by the value of the pole division of the linear stators 1 (i.e. by the winding pitch of the windings 2 of the stators 1) and by the frequency of the power supply. With a predetermined set pitch of the windings 2 and a given permanent frequency of the power supply to the stators 1, the speed of the motion of the magnetic field is constant.

The "running," or moving magnetic field induces eddy currents in the massive ferromagnetic rotor-rail 3. The interaction of these eddy currents with the "running" magnetic field creates a propelling force directed longitudinally of the rotor-rail 3 (perpendicularly to the plane of the drawing, FIG. 1) and applied to the stators 1. The magnitude of this propelling force created by the herein disclosed linear electric motor is proportional to the total area of the side surface total area of the side surface of the rotor-rail 3, which is in engaged in electromagnetic interaction with the two linear stators 1.

Since, as it has been already mentioned, in the herein described embodiment of the present invention it is the rotor-rail 3 which is secured to a stationary support, the action of the propelling force brings about linear motion of the stators 1 relative to the rotor-rail 3. The speed of the motion of the linear stators 1 and, consequently, of the housing structure 4 will lag behind the speed of the motion of the "running" magnetic field by the value of slip, which, in the course of set motion, depends on the resistance encountered by the motion of the vehicle propelled by the herein disclosed linear electric motor. Any convenient mechanical connection can be used for imparting the motion of the linear stators 1 and their supporting housing structure 4 to the vehicle propelled thereby, e.g. to the bogies (not shown) of a monorail vehicle.

Alternatively, the present invention can be embodied in a system where the linear stators 1 are stationary, and it is the rotor-rail 3 which is adapted to move relative to the stators and to transmit its motion to a working member or any other apparatus. In other respects the creation of the propelling force and utilization thereof are similar to the above-described case, when the rotor-rail 3 is a stationary one.

The incorporation of the massive rotor-rail 3 in the herein disclosed electric motor is responsible for the mechanical characteristics thereof, i.e. the dependence of the propelling force upon the amount of slip (or else on the speed of the motion of the linear electric motor) being a relatively sharply declining curve, the maximal electromagnetic propelling force being developed by the herein disclosed motor with the proportion of slip approaching 1.0 (the starting moment). By the stators 1 being displaced in a direction perpendicular to the direction of the motion of the "running" magnetic filed (i.e. either vertically upward or vertically downward in FIG. 1), the area of electromagnetic interaction of the linear stators 1 and the rotor-rail 3 is reduced, which makes the mechanical characteristic curve of the herein disclosed motor even more sharply declined, i.e. with the same amount of slip the motor would now develop a smaller propelling effort (in other words, with the same resistance to the motion of the vehicle the amount of slip would be greater, i.e. the speed of the motion of the motor and the vehicle propelled thereby would be smaller). In this manner displacement of the linear stators 1 relatively to the rotor-rail 3 can be used for infinite adjustment of the speed of the motion of the electric motor, and, consequently, of the travelling speed of a vehicle or a work-performing member propelled by the motor.

This displacement (upward raising in FIG. 1) of the linear stators 1 in respect of the rotor-rail 3, which amounts to speed control, is effected by the stator-lifting mechanism 6 which is either mechanically or electrically actuated. The incorporation of the electric drive 7 of the stator-lifting mechanism 6 provides for remote control of the travelling speed of the herein disclosed linear electric motor.

The provision of the auxiliary magnetic core 5 makes it possible to effect travelling speed control without affecting any substantially the power characteristics of the herein disclosed electric motor. When the linear stators 1 are lifted relative to the rotor-rail 3, the magnetic cores of the stators 1 are brought adjacent to the auxiliary magnetic core 5, and the magnetic flux of the stators 1 becomes partially completed through this auxiliary magnetic core 5. Owing to that, the magnetizing current of the stators 1 is not increased throughout the speed control range (on the contrary, the current may even decrease, on account of the magnetic permeability of the material of the auxiliary magnetic core being greater than that of the material of the rotor-rail 5).

The vertical dimension of the auxiliary magnetic core 5 is chosen to correspond to a desired range of speed control of the electric motor, and, preferably, it is 40 percent to 60 percent vertical dimension of the rotor-rail 3. The length of the auxiliary magnetic core 5 in the longitudinal direction is somewhat greater than the length of each one of the two linear stators 1, for the auxiliary magnetic core 5 to project at both ends thereof in the longitudinal direction beyond the adjacent ends of the stators 1, since the thrust rollers 9 (FIG. 2) which are positioned at both ends of the stators are displaced upon the auxiliary magnetic core 5, as the linear stators 1 are raised in the course of speed adjustment.

For no additional propelling or traction effort to be developed in the course of a speed control operation, i.e., when the auxiliary magnetic core 5 becomes penetrated by the magnetic flux of the linear stators 1, the auxiliary magnetic core 5 either should be made of a multileaf structure, with each leaf formed from electrical engineering steel sheet material (as it has been already explained), or else it should be molded from compressed ferrite powder.

Since it is a ferromagnetic bar (a steel rolled shape), which is used as the rotor-rail 3 in the herein disclosed embodiment of the present invention, there is displayed a force of magnetic attraction between the magnetic cores of the linear stator 1 and the rotor-rail 3. The force of magnetic attraction applies a laterally directed effort to the thrust rollers 9 (FIG. 2) and helps to maintain a desired preadjusted extent of the magnetic gaps 8 between the two stators 1 and the respective sides of the rotor-rail 3 (FIG. 1). In order to reduce the portion of the magnetic attraction force, which is transmitted to the thrust rollers 9, there are provided (as it has been already mentioned) at least two compensation devices 10 including precompressed springs. The compression force of these springs is taken up by the common housing structure 4 of the herein disclosed electric motor. The reduction of the lateral load of the thrust rollers 9 brings about reduced wearing out of the rollers and brings down the internal forces of the electric motor, which resist its linear motion.

The herein disclosed linear electric motor provides for its travelling speed being controllable within a wide range of values.

Speed control of the herein disclosed linear electric motor does not involve any additional devices, besides the above-described stator-lifting mechanism 6, and it does not affect the power characteristics of the electric motor.

An induction linear electric motor, constructed in accordance with the present invention, also provides for remote speed control, and it can be incorporated not only as propelling means for a monorail vehicle, but also for other types of vehicles and production machines, e.g. those with work-performing members actuated for linear motion.

What we claim is:

1. An induction linear electric motor, comprising: a rotor member; a pair of linear stator structures disposed, respectively, at the opposite sides of said rotor member; a pair of winding means carried, respectively, by said pair of linear stator structures; a source of electric current, said winding means being connectable to said source of electric current to produce a traveling magnetic field; an auxiliary magnetic core means positionable intermediate of said pair of linear electric stator structures for taking up at least a portion of a magnetic flux created by said pair of linear stator structures, as said linear stator structures are displaced relative to said rotor member in a direction perpendicular to the direction of the motion of said traveling magnetic field; a housing means supporting said pair of linear stator structures.

2. An induction linear electric motor, as set forth is claim 1, wherein said auxiliary magnetic core means is of a laminated structure.

3. An induction linear electric motor, as set forth in claim 1, wherein the length of said auxiliary magnetic core means is at least equal to the length of each one of said pair of linear stator structures.